(12) United States Patent
Yamashita et al.

(10) Patent No.: US 12,027,681 B2
(45) Date of Patent: *Jul. 2, 2024

(54) METHOD FOR RECOVERING VALUABLE METALS FROM WASTE LITHIUM ION BATTERIES

(71) Applicant: SUMITOMO METAL MINING CO., LTD., Tokyo (JP)

(72) Inventors: Yu Yamashita, Niihama (JP); Ryo Togashi, Niihama (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 798 days.

This patent is subject to a terminal disclaimer.

(21) Appl. No.: 17/258,772

(22) PCT Filed: Jul. 11, 2019

(86) PCT No.: PCT/JP2019/027576
§ 371 (c)(1),
(2) Date: Jan. 8, 2021

(87) PCT Pub. No.: WO2020/013294
PCT Pub. Date: Jan. 16, 2020

(65) Prior Publication Data
US 2021/0328283 A1    Oct. 21, 2021

(30) Foreign Application Priority Data

Jul. 12, 2018 (JP) .................... 2018-132647

(51) Int. Cl.
*C22B 9/10* (2006.01)
*H01M 10/0525* (2010.01)
(Continued)

(52) U.S. Cl.
CPC ............. *H01M 10/54* (2013.01); *C22B 9/10* (2013.01); *C22B 9/106* (2013.01); *H01M 10/0525* (2013.01)

(58) Field of Classification Search
CPC ............ C22B 7/00; C22B 7/001; C22B 7/004; C22B 15/00; C22B 15/0026;
(Continued)

(56) References Cited

U.S. PATENT DOCUMENTS

2012/0240729 A1    9/2012   Verscheure et al.
2014/0060250 A1*   3/2014   Takahashi ........... C22B 21/0084
                                                            75/414
(Continued)

FOREIGN PATENT DOCUMENTS

CN    101252186 A    8/2008
CN    103380218 A    10/2013
(Continued)

OTHER PUBLICATIONS

Guo-xing Ren, et al. Recovery of valuable metals from spent lithium ion batteries by smelting reduction process based on FeO-SiO2-Al2O3 slag system, 2017, Transactions of Nonferrous Metals Society of China, vol. 27, Issue 2, pp. 450-456 (Year: 2017).*

(Continued)

*Primary Examiner* — Vanessa T. Luk
*Assistant Examiner* — Nikolas Takuya Pullen
(74) *Attorney, Agent, or Firm* — Locke Lord LLP; James E. Armstrong, IV; Nicholas J. DiCeglie, Jr.

(57) ABSTRACT

Provided is a more efficient dry refining process for improving the recovery rate of phosphorus-free valuable metals from waste lithium ion batteries. The present invention provides a method for recovering valuable metals from waste lithium ion batteries, said method comprises a melting step S4 for melting the waste lithium ion batteries and
(Continued)

obtaining a molten substance and a slag separation step S5 for separating slag from the molten substance and recovering an alloy containing valuable metals, wherein in the melting step, flux containing a calcium compound is added to the waste lithium ion batteries such that the mass ratio between silicon dioxide and calcium oxide in the slag becomes 0.50 or less and the mass ratio between calcium oxide and aluminum oxide falls in the range of 0.30 to 2.00.

16 Claims, 1 Drawing Sheet

(51) Int. Cl.
  *H01M 10/54* (2006.01)
  *C22B 7/00* (2006.01)
  *C22B 15/00* (2006.01)
  *C22B 23/02* (2006.01)

(58) Field of Classification Search
  CPC .............. C22B 15/0028; C22B 15/005; C22B 15/0052; C22B 15/0056; C22B 23/00; H01M 10/54
  See application file for complete search history.

(56) References Cited

U.S. PATENT DOCUMENTS

| | | |
|---|---|---|
| 2014/0069234 A1 | 3/2014 | Takahashi et al. |
| 2014/0174256 A1 | 6/2014 | Takahashi et al. |
| 2014/0318313 A1 | 10/2014 | Takahashi et al. |
| 2017/0005374 A1 | 1/2017 | Brouwer et al. |
| 2021/0328283 A1 | 10/2021 | Yamashita et al. |
| 2022/0274841 A1* | 9/2022 | Rohde .................... C01D 15/02 |

FOREIGN PATENT DOCUMENTS

| | | |
|---|---|---|
| CN | 103380220 A | 10/2013 |
| CN | 103459623 A | 12/2013 |
| CN | 103526035 A | 1/2014 |
| EP | 3269832 A1 | 1/2018 |
| JP | S61-261445 A | 11/1986 |
| JP | H08-013052 A | 1/1996 |
| JP | H10-158751 A | 6/1998 |
| JP | 2003-160819 A | 6/2003 |
| JP | 2009-041052 A | 2/2009 |
| JP | 2012-057238 A | 3/2012 |
| JP | 2012-102350 A | 5/2012 |
| JP | 2012-172169 A | 9/2012 |
| JP | 2012-224877 A | 11/2012 |
| JP | 2013-064177 A | 4/2013 |
| JP | 5818798 B2 | 11/2015 |
| JP | 5853585 B2 | 2/2016 |
| JP | 2017-509786 A | 4/2017 |
| JP | 2017-526820 A | 9/2017 |
| JP | 6542354 B2 | 7/2019 |
| JP | 2019-135321 A | 8/2019 |
| KR | 10-2007-0046990 A | 5/2007 |
| KR | 10-2013-0114723 A | 10/2013 |
| WO | 2013/080266 A1 | 6/2013 |
| WO | 2015/096945 A1 | 7/2015 |
| WO | 2016/023778 A1 | 2/2016 |
| WO | 2020/013294 A1 | 1/2020 |

OTHER PUBLICATIONS

International Search Report mailed Oct. 1, 2019, issued for PCT/JP2019/027576.

Danczak, Anna et al., Behavior of Battery Metals Lithium, Cobalt, Manganese, and Lanthanum in Black Copper Smelting, Batteries, Mar. 2, 2020, pp. 1-17.

Office Action issued in the U.S. Appl. No. 18/014,200, mailed on Aug. 25, 2023.

* cited by examiner

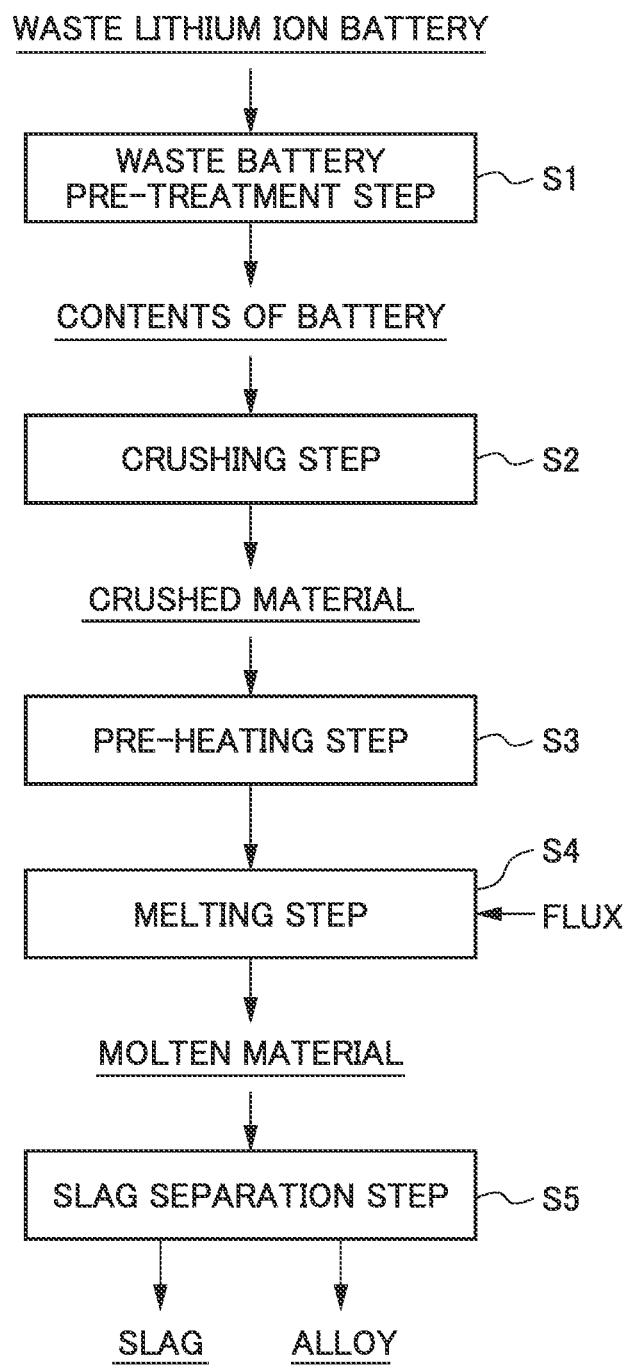

METHOD FOR RECOVERING VALUABLE METALS FROM WASTE LITHIUM ION BATTERIES

TECHNICAL FIELD

The present invention relates to a method for recovering valuable metals from a waste lithium ion battery.

BACKGROUND ART

In recent years, lithium ion batteries have been widely used as secondary batteries which are lightweight, and which produce a high output. As the lithium ion battery, a lithium ion battery is known where a negative electrode material in which a negative electrode active material such as graphite is fixedly adhered to a negative electrode current collector formed of copper foil, a positive electrode material in which a positive electrode active material such as lithium nickelate or lithium cobalt oxide is fixedly adhered to a positive electrode current collector formed of aluminum foil, a separator which is formed with a polypropylene porous resin film or the like, an electrolytic solution which includes an electrolyte such as lithium hexafluorophosphate ($LiPF_6$), and the like are sealed into an exterior can formed of a metal such as aluminum or iron.

As one of the main applications of the lithium ion battery, hybrid and electric automobiles are present, and along with the life cycles of the automobiles, a large number of lithium ion batteries mounted thereon are expected to be discarded in the future. A large number of proposals have been made in which the above-described used batteries and defective products that were generated during the production (hereinafter referred to as "waste lithium ion batteries") are recycled as resources, and as a method of recycling the waste lithium ion batteries, a dry smelting process is proposed in which all the waste batteries are melted in a high-temperature furnace.

Since in the waste lithium ion battery, not only valuable metals such as nickel, cobalt, and copper; but also impurity components such as carbon, aluminum, fluorine, and phosphorus are included, when the valuable metals are recovered from the waste lithium ion battery, these impurity components need to be removed. The remaining carbon among these impurity components prevents the separation of the metals and slag. Since carbon contributes as a reducing agent, the proper oxidation removal of other substances may be prevented. Since in particular, among the impurity components described above, phosphorus is relatively easily reduced, when the degree of reduction thereof is adjusted to be excessively high in order to increase the rate of recovery of valuable metals such as cobalt, phosphorus remains in the metals without being removed by oxidation. On the other hand, when the degree of reduction is adjusted to be excessively low, even the valuable metals are oxidized, with the result that the rate of recovery is lowered.

Hence, in order to stably perform the recovery of the valuable metals and the removal of phosphorus, the amount of carbon needs to be stably controlled. In order to reduce the remaining phosphorus in the metals while the rate of recovery of the valuable metals is being maintained to be high, it is preferable to use a flux which can selectively remove phosphorus.

For example, Patent Document 1 proposes, as a dry method of recovering cobalt from a waste lithium ion battery, a process which casts the waste lithium ion battery into a melting furnace and which performs oxidation by oxygen. Although in this process, cobalt can be recovered at a high recovery rate, the removal of phosphorus is not disclosed, and thus it is not clear whether or not the recovery of valuable metals and the removal of phosphorus can be stably performed.

Patent Document 2 proposes a process where a dephosphorization step is performed that adds $SiO_2$ and CaO when a waste lithium ion battery is melted, thereby lowering the melting point of slag so as to facilitate the separation of metals and the slag, and that then adds CaO while blowing oxygen on the metals after the separation of the slag so as to remove phosphorus. Although it is possible to remove phosphorus even with this process, in order to further reduce the production cost, an efficient process without need of the dephosphorization step is desired.

Patent Document 1: Japanese Patent No. 5818798
Patent Document 2: Japanese Patent No. 5853585

DISCLOSURE OF THE INVENTION

Problems to be Solved by the Invention

The present invention is proposed in view of the situation as described above, and an object thereof is to provide a more efficient dry smelting process in order to increase the rate of recovery of, from a waste lithium ion battery, valuable metals from which phosphorus is removed.

Means for Solving the Problems

The present inventors have performed a thorough study in order to solve the problem described above. Consequently, the present inventors have found that when a waste lithium ion battery is melted, a flux containing a calcium compound is used such that the composition of slag included in a molten material falls within a specific range, and that thus valuable metals such as copper, nickel, and cobalt can be recovered as an alloy at a high recovery rate and; moreover, phosphorus is effectively removed in the recovered valuable metals, with the result that the present inventors have completed the present invention.

(1) A first invention of the present invention is a method for recovering valuable metals from a waste lithium ion battery, and the method includes: a melting step of melting the waste lithium ion battery so as to obtain a molten material; and a slag separation step of separating slag from the molten material so as to recover an alloy including the valuable metals; and in the melting step, a flux containing a calcium compound is used, and the flux is added to the waste lithium ion battery such that a mass ratio of silicon dioxide to calcium oxide in the slag is equal to or less than 0.50 and that a mass ratio of calcium oxide to aluminum oxide is equal to or greater than 0.30 and equal to or less than 2.00.

(2) A second invention of the present invention is a method for recovering valuable metals in which in the first invention, the valuable metals are one or more types selected from at least cobalt, nickel, and copper.

(3) A third invention of the present invention is a method for recovering valuable metals in which in the first or second invention, a heating temperature in the melting step is equal to or greater than 1300° C. and equal to or less than 1500° C.

(4) A fourth invention of the present invention is a method for recovering valuable metals in which in any one of the first to third inventions, a phosphorus grade in the alloy recovered in the slag separation step is less than 0.1% by mass.

(5) A fifth invention of the present invention is a method for recovering valuable metals in which in any one of the first to fourth inventions, calcium carbonate is used as the calcium compound.

Effects of the Invention

According to the present invention, it is possible to provide a more efficient dry smelting process in order to increase the rate of recovery of, from a waste lithium ion battery, valuable metals from which phosphorus is removed.

BRIEF DESCRIPTION OF THE DRAWINGS

FIG. 1 is a process chart which shows an example of the flow of a method for recovering valuable metals.

PREFERRED MODE FOR CARRYING OUT THE INVENTION

A specific embodiment (hereinafter referred to as the "present embodiment") of the present invention will be described in detail below. The present invention is not limited to the following embodiment, and various modifications are possible without departing from the spirit of the present invention.

<<1. Outline of Method for Recovering Valuable Metals>>

A method for recovering valuable metals according to the present embodiment is a method for recovering valuable metals which are included in a waste lithium ion battery containing phosphorus. The method for recovering valuable metals from the waste lithium ion battery is roughly divided into a dry smelting process and a wet smelting process. The method for recovering valuable metals according to the present embodiment is mainly related to the dry smelting process.

The waste lithium ion battery is a concept which includes a used lithium ion battery, a defective product generated in the production process of a positive electrode material or the like of the lithium ion battery, a residue within the production process and a waste material such as waste generated within the production process of the lithium ion battery, and they are often in a mixed state and treated in such a state. The waste lithium ion battery includes, for example, valuable metals such as copper, nickel, and cobalt.

Although here, the amount of each of the valuable metals included in the waste lithium ion battery is not particularly limited, for example, an amount of copper equal to or greater than 10% by mass or equal to or greater than 20% by mass may be included.

FIG. 1 is a process chart which shows an example of the flow of the method for recovering valuable metals. As shown in FIG. 1, the method for recovering valuable metals according to the present embodiment includes: a waste battery pre-treatment step S1 of removing the electrolytic solution and the exterior can of the waste lithium ion battery; a crushing step S2 of crushing the contents of the battery so as to form a crushed material; a pre-heating step S3 of pre-heating the crushed material as necessary; a melting step S4 of melting the crushed material after being pre-heated as necessary under the presence of a flux so as to form an alloy; and a slag separation step S5 of separating slag from the molten material so as to recover the alloy including the valuable metals.

<<2. Individual Steps in Recovering Method>>

The individual steps in the method for recovering valuable metals according to the present embodiment will be specifically described below.

[Waste Battery Pre-Treatment Step]

The waste battery pre-treatment step S1 is performed, for example, in order to prevent the explosion of the waste lithium ion battery or to detoxify the waste lithium ion battery and to remove the exterior can. Specifically, since a waste lithium ion battery such as the used lithium ion battery is a sealed system and has electrolytic solution and the like therewithin, when the waste lithium ion battery is subjected to crushing treatment without being processed, the waste lithium ion battery is dangerous because it may explode. Hence, it is necessary to perform discharge treatment and removal treatment of the electrolytic solution in some way. As described above, in the waste battery pre-treatment step S1, the electrolytic solution and the exterior can are removed, and thus it is possible to enhance safety and the productivity of recovery of the valuable metals such as copper, nickel, and cobalt.

Although a specific method in the waste battery pre-treatment step S1 is not particularly limited, for example, a hole is physically opened in the battery with a needle-shaped cutting edge, and thus the electrolytic solution therewithin can be made to flow out so as to be removed. The waste lithium ion battery may be detoxified by heating the waste lithium ion battery without being processed and thereby burning the electrolytic solution.

Since the exterior can is often formed of a metal such as aluminum or iron, the waste battery pre-treatment step S1 is performed, and thus the metallic exterior can as described above can be relatively easily recovered as the valuable metals without being processed. For example, when aluminum or iron included in the exterior can are recovered, the removed exterior can is crushed and can be thereafter sieved with a sieve shaker. In the case of aluminum, even when the exterior can is lightly crushed, it is easily formed into powder, with the result that aluminum can be efficiently recovered. By sorting using a magnetic force, it is also possible to recover iron included in the exterior can.

[Crushing Step]

In the crushing step S2, the contents of the battery obtained through the waste battery pre-treatment step S1 are crushed, and thus the crushed material is obtained. The treatment in the crushing step S2 is performed in order to enhance the efficiency of reactions in the dry smelting process of the subsequent steps, and the efficiency of the reactions is enhanced, with the result that the rate of recovery of the valuable metals such as copper, nickel, and cobalt can be increased.

Although a specific crushing method in the crushing step S2 is not particularly limited, the contents of the battery can be crushed with a conventionally known crusher such as a cutter mixer.

[Pre-Heating Step]

The pre-heating step S3 is performed as necessary on the crushed material of the waste lithium ion battery obtained through the crushing step S2. The pre-heating step S3 is performed, and thus the impurities included in the contents of the battery can be removed by being volatilized through heating or by being thermally decomposed.

In the pre-heating step S3, heating is preferably performed at a temperature (pre-heating temperature) equal to or greater than 700° C. The pre-heating temperature is equal to or greater than 700° C., and thus the efficiency of removal of the impurities included in the battery can be further enhanced. On the other hand, the upper limit of the pre-heating temperature is set to such a temperature range that the crushed material of the waste lithium ion battery is not melted, and more specifically, the upper limit is preferably set to equal to or less than 900° C. In this way, the thermal energy cost can be reduced, and thus the efficiency of the treatment can be enhanced.

The pre-heating step S3 is preferably performed under the presence of an oxidant. In this way, it is possible to remove, among the impurities included in the contents of the battery, carbon by oxidation and to oxidize aluminum. In particular, carbon is removed by oxidation, and thus molten fine particles of the valuable metals generated locally in the subsequent melting step S4 can be aggregated without the physical interference of carbon, with the result that the alloy obtained as the molten material can be easily recovered as the integral alloy. In general, major elements of the waste lithium ion battery are easily oxidized due to differences in their affinity with oxygen in the order of aluminum>lithium>carbon>manganese>phosphorus>iron>cobalt>nickel>copper.

Although here, the oxidant is not particularly limited, in terms of ease of handling, a gas including oxygen such as air, pure oxygen, or an oxygen-enriched gas is preferably used. The amount of oxidant introduced here can be about 1.2 times a chemical equivalent which is necessary for the oxidation of each of the substances serving as targets for the oxidation treatment.

[Melting Step]

In the melting step S4, the crushed material of the waste lithium ion battery after being pre-heated is melted together with the flux as necessary, and thus the molten material formed of the slag and the alloy including the valuable metals is obtained. In this way, impurity elements such as aluminum are included as oxides in the slag, and phosphorus is also incorporated into the flux so as to be included in the slag. On the other hand, the valuable metals such as copper which are unlikely to form oxides are melted, and can be recovered from the molten material as the integral alloy. The alloy obtained from the molten material is also called a "molten alloy".

The flux which is added to the waste lithium ion battery preferably includes an element that incorporates an impurity element so as to form a basic oxide having a low melting point, and in particular, the flux more preferably includes a calcium compound because the calcium compound is inexpensive and stable at room temperature. Since phosphorus is oxidized so as to form an acidic oxide, as the slag formed in the treatment of the melting step S4 becomes basic, phosphorus is more easily incorporated into the slag. Here, as the calcium compound, for example, calcium oxide or calcium carbonate can be used. In particular, as the calcium compound, calcium carbonate is used, and thus the calcium carbonate is thermally decomposed at a temperature lower than a heating temperature (melting temperature) in the melting step S4 so as to generate calcium oxide, with the result that the same effect as in the case where calcium oxide is used as the calcium compound is achieved. Since unlike the calcium oxide, the calcium carbonate does not produce an exothermic reaction with water and hardly affects the human body, the calcium carbonate is also excellent in ease of storage and handling.

The flux is added to the waste lithium ion battery such that, as a ratio of a calcium component and a silicon component in the slag after being melted, and based on the oxides, a mass ratio of silicon dioxide ($SiO_2$) to calcium oxide (CaO) (hereinafter also referred to as the "mass ratio $SiO_2/CaO$") is equal to or less than 0.50.

Here, the silicon component such as silicon dioxide is a component which forms an acidic oxide in the slag, and which is unlikely to be volatilized by the heating of the melting step S4. Hence, when the waste lithium ion battery is heated in the melting step S4, the silicon component is reduced relative to the calcium compound which forms a basic oxide, and thus the slag formed in the melting step S4 is inclined to basicity, with the result that phosphorus can be easily incorporated into the slag. In this regard, in the present embodiment, the flux is added such that the mass ratio of the silicon dioxide to calcium oxide is decreased, and thus phosphorus is incorporated into the slag, with the result that it is possible to facilitate the removal of phosphorus from the alloy.

The flux is added to the waste lithium ion battery such that, based on the oxides, a mass ratio of calcium oxide (CaO) to aluminum oxide ($Al_2O_3$) in the slag after being melted (hereinafter also referred to as the "mass ratio $CaO/Al_2O_3$") is equal to or greater than 0.30 and equal to or less than 2.00. Here, the flux may be added such that the mass ratio $CaO/Al_2O_3$ is equal to or greater than 0.40. On the other hand, the flux may be added such that the mass ratio $CaO/Al_2O_3$ is equal to or less than 1.90.

Here, since the aluminum oxide is a component which increases the melting point of the slag, when the waste lithium ion battery is heated in the melting step S4, if the amount of aluminum oxide is high, a sufficient amount of calcium component is needed in order to melt the aluminum oxide. The aluminum oxide is also a component which forms an amphoteric oxide, and which is formed into an acidic oxide or a basic oxide. Hence, in the slag after being melted, the aluminum oxide is adjusted within a predetermined range relative to the calcium compound which forms a basic oxide, and thus the aluminum oxide can be melted in the heating of the melting step S4 and its acidity can be appropriately controlled when the aluminum oxide is melted, with the result that phosphorus can be easily incorporated into the slag.

When the flux is added to the waste lithium ion battery, the adjustment of each of the mass ratios in the slag after being melted may be performed by adjusting the amount of flux added to the waste lithium ion battery or may be performed by adjusting the concentration of a component included in the flux.

When the flux is added to the waste lithium ion battery, the flux may be added such that, based on the oxides, the calcium oxide included in the slag after being melted is preferably equal to or greater than 10% by mass, more preferably equal to or greater than 15% by mass and further preferably equal to or greater than 21% by mass. In this way, the rate of recovery of the valuable metals from the waste lithium ion battery, in particular, the rate of recovery of cobalt, can be increased. On the other hand, from an economic point of view, the flux may be added such that the calcium oxide included in the slag after being melted is equal to or less than 80% by mass or the flux may be added such that the calcium oxide is equal to or less than 60% by mass.

Here, in the present specification, the mass of each of the components in the slag after being melted "based on the oxides" is the mass of the corresponding oxide when it is assumed that the components included in the slag after being melted are all changed into the oxides.

The melting step S4 may be performed under the presence of an oxidant and a reducing agent in order to appropriately adjust the degree of oxidation-reduction when the waste lithium ion battery is melted.

Here, as the oxidant, a known oxidant can be used. As a method of bringing the oxidant into contact with the crushed material of the waste lithium ion battery, a solid oxidant may be added to the waste lithium ion battery or a gaseous oxidant may be introduced into a furnace.

Although as the reducing agent, a known reducing agent can be used, a reducing agent including a carbon atom is preferable. The reducing agent including a carbon atom is added to the waste lithium ion battery, and thus the oxides of copper, nickel, cobalt, and the like of the valuable metals, which are included in the waste lithium ion battery and which are targets to be recovered, can be easily reduced. As an example of the reducing agent including a carbon atom, graphite is mentioned, in which 2 moles of a valuable metal oxide such as a copper oxide or a nickel oxide can be reduced by 1 mole of carbon. A hydrocarbon which can reduce 2 to 4 moles of a valuable metal oxide per mole of carbon, carbon monoxide which can reduce 1 mole of a valuable metal oxide per mole of carbon, or the like can be added as a supply source of carbon. Hence, reduction melting is performed under the presence of carbon serving as the reducing agent, and thus the valuable metals are efficiently reduced, with the result that the alloy including the valuable metals can be obtained more effectively. It is also advantageous that in the reduction using carbon, safety is extremely high, for example, as compared with a case where a thermite reaction is utilized in which reduction is performed using a metal powder of aluminum or the like as a reducing agent.

In particular, when carbon is added as the reducing agent, an excessive amount of carbon may be added. When the amount of carbon added is excessive, if a phosphorus compound is included in the waste lithium ion battery, though it is likely that the phosphorus compound is also reduced by the carbon described above so as to be included in a molten alloy phase, in the method for recovering valuable metals according to the present invention, the waste lithium ion battery is melted under the presence of the flux, with the result that such phosphorus can be incorporated into the flux so as to be removed.

Although a heating temperature (melting temperature) in the melting treatment is not particularly limited, the heating temperature preferably falls within a range equal to or greater than 1300° C. and more preferably falls within a range equal to or greater than 1350° C. The melting treatment is performed at a temperature equal to or greater than 1300° C., and thus the valuable metals such as Cu, Co, and Ni are melted so as to form the molten alloy in a state where fluidity is sufficiently enhanced, with the result that it is possible to enhance the efficiency of separation of the valuable metals and the impurities in the slag separation step S5 which will be described later.

On the other hand, when the melting temperature exceeds 1500° C., thermal energy is consumed wastefully, and thus the wear of refractories such as a melting pot and a furnace wall becomes significant, with the result that the productivity may be lowered. Hence, the melting temperature is preferably equal to or less than 1500° C.

Although in the melting treatment, dust, exhaust gas, and the like may be generated, they can be detoxified by performing conventionally known exhaust gas treatment.

As described above, the method for recovering valuable metals according to the present invention is characterized in that when the waste lithium ion battery is melted, the flux containing the calcium compound is added to the waste lithium ion battery such that the composition of the slag included in the molten material falls within a specific range. In this recovering method, the valuable metals such as copper, nickel, and cobalt included in the waste lithium ion battery can be recovered as the alloy at a high recovery rate, and phosphorus included in the alloy can be effectively removed.

[Slag Separation Step]

In the slag separation step S5, the slag is separated from the molten material obtained in the melting step S4, and thus the alloy including the valuable metals is recovered. Here, since the alloy and the slag included in the molten material are different in specific gravity, the difference in specific gravity is utilized, and thus the slag and the alloy can be individually recovered. Here, it is also possible to recover the alloy material in which a phosphorus grade is less than 0.1% by mass.

Here, treatment in the smelting process when the valuable metals are recovered from the alloy can be performed by a known method such as neutralization treatment or solvent extraction treatment, and is not particularly limited. To give one example, in a case where the alloy is formed of cobalt, nickel, and copper, after the valuable metals are leached with an acid such as sulfuric acid (leaching step), for example, copper is extracted by solvent extraction or the like (extraction step), and the solution of nickel and cobalt which is left can be sent out to a positive electrode active material production process in a battery production process.

In the method for recovering valuable metals according to the present invention, when the waste lithium ion battery is melted, the alloy from which phosphorus is removed can be obtained, and thus the smelting process when the valuable metals are recovered from the alloy can be simplified. In other words, dephosphorization treatment does not need to be performed on the obtained alloy. Hence, with the process from the waste battery pre-treatment step S1 to the slag separation step S5 serving as pretreatment in a broad sense, the smelting process in which the valuable metals are recovered from the obtained alloy is performed, with the result that the valuable metals can be efficiently obtained at a higher recovery rate.

EXAMPLES

Although the present invention will be described in further detail below using Examples and Comparative Examples, the present invention is not limited to Examples below at all.

<Waste Battery Pre-Treatment Step>

First, as waste lithium ion batteries, a 18650-type cylindrical battery, a used square battery for in-vehicle use, and a defective product collected in a battery production process were prepared. Then, the waste lithium ion batteries described above were immersed together in salt water so as to be discharged, after which water was removed, the waste lithium ion batteries were roasted at a temperature of 260° C. in the atmosphere, and electrolytic solutions and exterior cans were decomposed so as to be removed. Thus, the contents of the batteries were obtained. The major element composition of the contents of the batteries was as shown in table 1 below.

[Table 1]

<Crushing Step>

Then, the contents of the batteries were crushed with a crusher (product name: Good Cutter, made by Ujiie manufacturing Co., Ltd.), and thus a crushed material was obtained.

<Pre-Heating Step>

Then, the obtained crushed material was put into a rotary kiln, and was pre-heated at a pre-heating temperature of 800° C. for 180 minutes in the atmosphere.

<Melting Step>

Calcium oxide was added as a flux to the crushed material after being pre-heated (Examples 1 to 3 and 5 to 8 and Comparative Example 1) or calcium oxide and silicon dioxide were added as a flux thereto (Examples 4 and 9 and Comparative Examples 2 and 3) and graphite powder was added as a reducing agent thereto in order to adjust the degree of oxidation-reduction, and they were mixed together and were charged into an alumina crucible. This mixture was heated by resistance heating to the temperatures (melting temperatures) shown in table 2 below, melting treatment was performed for 60 minutes, and thus valuable metals were changed into an alloy.

<Slag Separation Step>

With respect to a molten material after the melting treatment was performed, a difference in specific gravity was utilized, and thus slag was separated from the molten material, and the alloy was recovered.

On the slag after the alloy was recovered, an elemental analysis was performed with an ICP analyzer (made by Agilent Technologies Japan, Ltd., Agilent5100SUDV), and thus the amounts of calcium component, aluminum component, and silicon component (the amounts of CaO, $Al_2O_3$ and $SiO_2$ based on the oxides) were determined as ratios (mass %) with respect to the total mass of the slag.

On the alloy after the slag was separated, an elemental analysis was also performed with the ICP analyzer (made by Agilent Technologies Japan, Ltd., Agilent5100SUDV), and thus the amounts of cobalt and phosphorus were measured, with the result that the rate of recovery of cobalt from the contents of the batteries and a phosphorus grade in the alloy were determined.

The amounts of CaO, $Al_2O_3$ and $SiO_2$ based on the oxides with respect to the total mass of the slag, a mass ratio $SiO_2/CaO$ and a mass ratio $CaO/Al_2O_3$, the rate of recovery of cobalt from the contents of the batteries, and the results of the measurements of the phosphorus grade in the alloy are shown in table 2 below.

[Table 2]

As found from the results of table 2, on the alloys obtained in Examples 1 to 9, satisfactory results were obtained in which the rate of recovery of the cobalt that was the valuable metal included in the batteries was equal to or greater than 95% and in which the phosphorus grade in the obtained alloy was less than 0.1% by mass. In other words, the flux containing a calcium compound was added to the crushed material of the contents of the batteries and the melting treatment was performed such that the composition of the slag fell within a specific range, and thus it was possible to obtain the valuable metals at high recovery rates and to remove phosphorus effectively.

Although in particular, in Examples 4, 8 and 9, where the amount of CaO component included in the slag was low, the phosphorus grade in the obtained alloy was low as in Examples 1 to 8, the rate of recovery of cobalt was low as compared with Examples 1 to 3 and 5 to 7. Hence, it is also found that for example, when a waste battery including almost no cobalt is treated, the added amount of flux containing the calcium compound is reduced, and thus it is possible to effectively recover the valuable metals from which phosphorus is effectively removed while the flux is being effectively saved.

On the other hand, in Comparative Example 1, the phosphorus grade in the obtained alloy was higher than in Examples 1 to 8. It is inferred that the reason for this is that since the mass ratio $CaO/Al_2O_3$ was not sufficiently high, the removal of phosphorus from the alloy by the calcium component included in the flux was insufficient.

Even in Comparative Examples 2 and 3, the phosphorus grade in the obtained alloy was higher than in Examples 1 to 8. It is inferred that the reason for this is that since the mass ratio $SiO_2/CaO$ was high and thus the basicity of the slag was not sufficiently increased, the removal of phosphorus from the alloy was inhibited.

The invention claimed is:

1. A method for recovering valuable metals from a waste lithium ion battery, the method comprising:
   a pre-heating step of heating the waste lithium ion battery at a temperature equal to or greater than 700° C. under presence of an oxidant;
   a melting step of melting the waste lithium ion battery after being heated so as to obtain a molten material; and
   a slag separation step of separating slag from the molten material so as to recover an alloy including the valuable metals,
   wherein in the melting step, a reducing agent including a carbon atom is added, a flux containing a calcium compound is used under presence of the reducing agent, the flux is added to the waste lithium ion battery such that a mass ratio of silicon dioxide to calcium oxide in the slag is equal to or less than 0.50 and that a mass ratio of calcium oxide to aluminum oxide is equal to or greater than 0.30 and equal to or less than 2.00 and the melting is performed.

2. The method for recovering valuable metals according to claim 1, wherein the valuable metals are one or more types selected from the group consisting of cobalt, nickel, and copper.

3. The method for recovering valuable metals according to claim 2, wherein a heating temperature in the melting step is equal to or greater than 1300° C. and equal to or less than 1500° C.

4. The method for recovering valuable metals according to claim 3, wherein a phosphorus grade in the alloy recovered in the slag separation step is less than 0.1% by mass.

5. The method for recovering valuable metals according to claim 4, wherein calcium carbonate is used as the calcium compound.

6. The method for recovering valuable metals according to claim 3, wherein calcium carbonate is used as the calcium compound.

7. The method for recovering valuable metals according to claim 2, wherein a phosphorus grade in the alloy recovered in the slag separation step is less than 0.1% by mass.

8. The method for recovering valuable metals according to claim 7, wherein calcium carbonate is used as the calcium compound.

9. The method for recovering valuable metals according to claim 2, wherein calcium carbonate is used as the calcium compound.

10. The method for recovering valuable metals according to claim 1, wherein a heating temperature in the melting step is equal to or greater than 1300° C. and equal to or less than 1500° C.

11. The method for recovering valuable metals according to claim 10, wherein a phosphorus grade in the alloy recovered in the slag separation step is less than 0.1% by mass.

12. The method for recovering valuable metals according to claim 11, wherein calcium carbonate is used as the calcium compound.

13. The method for recovering valuable metals according to claim 10, wherein calcium carbonate is used as the calcium compound.

14. The method for recovering valuable metals according to claim 1, wherein a phosphorus grade in the alloy recovered in the slag separation step is less than 0.1% by mass.

15. The method for recovering valuable metals according to claim 14, wherein calcium carbonate is used as the calcium compound.

16. The method for recovering valuable metals according to claim 1, wherein calcium carbonate is used as the calcium compound.

* * * * *